3,427,215
TIRE TREATMENT DEVICE
William R. Crocker, General Delivery,
Irondale, Mo. 63648
Filed Aug. 6, 1965, Ser. No. 477,690
U.S. Cl. 156—408                    14 Claims
Int. Cl. B29h 17/10

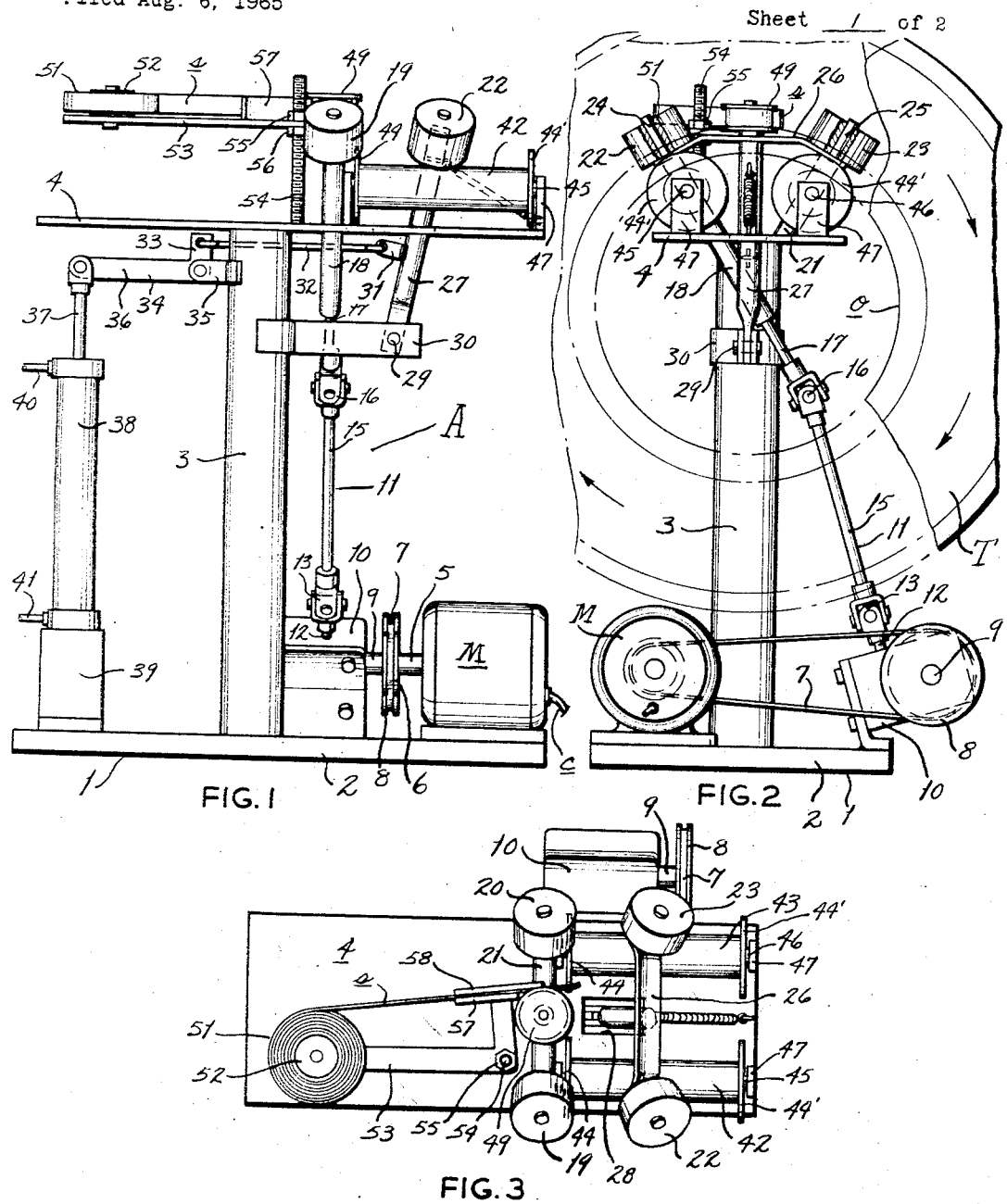

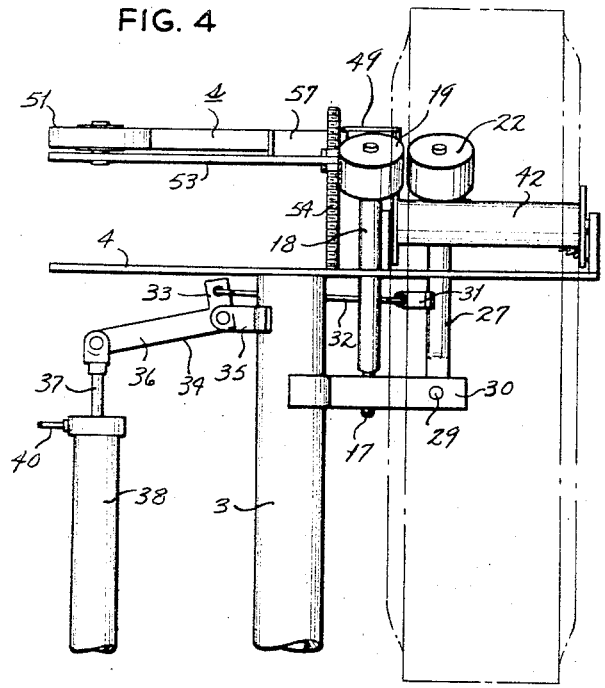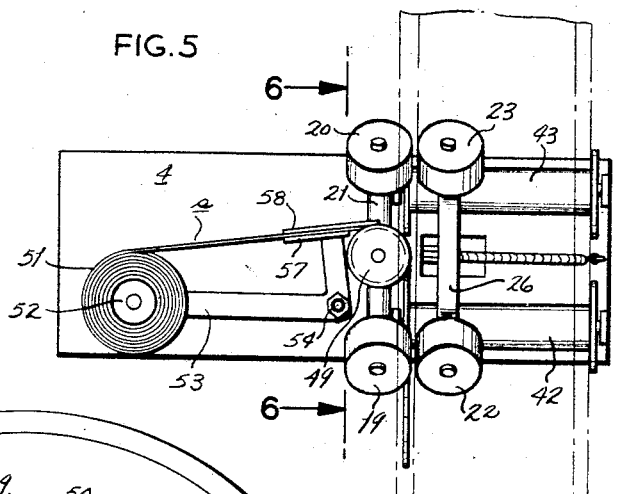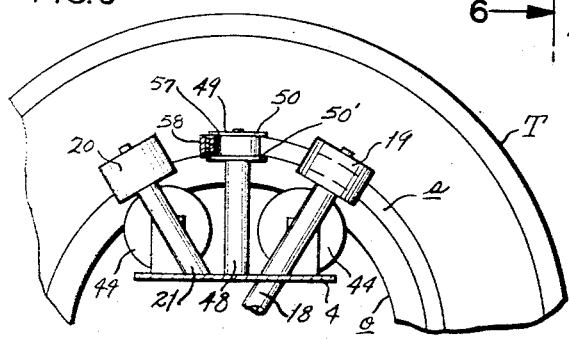

ABSTRACT OF THE DISCLOSURE

A machine for applying white sidewalls to the outer sidewall portion of a tire utilizing a pair of horizontally presented bed rolls for supporting a tire in upright position, and a plurality of roller members which are adapted for presentation in confronting relationship to the outer and inner sidewall portions of said tire in compressed relationship whereby upon driving one of said rollers the tire will be rotated in a vertical plane for the application of white sidewall material thereon.

Background of the invention

This invention relates in general to vehicle tires and, more particularly, to a machine for a treatment of tires, especially with respect to applying white sidewalls thereto.

It is an object of the present invention to provide a device which is adapted for automatically applying white sidewalls to automotive tires.

It is another object of the present invention to provide a device of the character stated which is adapted for accommodating tires of varying sizes and dimensions so that the same is extremely versatile and markedly economical in operation.

It is another object of the present invention to provide a tire treatment device which assures of the accurate and proper disposition of a white sidewall material upon the side of the tire in a reliably accurate manner and at a relatively elevated speed so as to be amenable for high volume production.

It is another object of the present invention to provide a machine of the character stated which obviates the heretofore accepted, laborious procedure of applying white sidewall material to vehicle tires by hand with the expected consequent imperfections.

It is another object of the present invention to provide a device of the character stated which may be easily adapted for effecting other treatment procedures with respect to tires.

It is a still further object of the present invention to provide a device of the character stated which may be economically manufactured; which does not require operation by skilled personnel; which may be relatively easily transported for location at convenient sites within an operating area; which has a marked simplicity of parts for extreme durability; and which is designed to reliably support and maintain a tire against inadvertent displacement during operation.

Other objects and details of the present invention will be apparent from the following description when read in connection with the accompanying drawings (2 sheets), wherein—

FIGURE 1 is a side elevational view of a tire treatment device constructed in accordance with and embodying the present invention.

FIGURE 2 is a rearward end view.

FIGURE 3 is a top plan view.

FIGURE 4 is a fragmentary side elevational view taken from the same side as FIGURE 1, but illustrating a tire in gripped condition.

FIGURE 5 is a top plan view of the device as illustrated in FIGURE 4.

FIGURE 6 is a fragmentary vertical view in partial section, taken on the line 6—6 of FIGURE 5.

Referring now by reference characters to the drawings which illustrate the preferred embodiment of the present invention, A generally designates a tire treatment device, particularly suitable for applying white sidewall material to the sidewalls of vehicle tires, comprising a support structure 1 incorporating a base plate 2, an upstanding column or standard 3 fixed at its lower end on said plate 2, and a flat, horizontally presented, top plate 4 rigid upon the upper end of column 3 and being of suitable transverse extent for projection at its rearward end through the central opening o of a vehicle tire, as indicated at T.

Bolted or otherwise disposed on base plate 2 is a prime mover M having a drive shaft 5 mounting a pulley 6 about which is engaged an endless drive belt 7 which latter is, in turn, trained about a pulley 8 carried on the main shaft 9 of a gear box 10 which is suitably supported upon base plate 2. Prime mover M is connected to a convenient source of electrical energy, as by a cord c, for effecting rotation of main shaft 5 for motion transmission through gear box 10 to an upwardly projecting, driven shafting, indicated broadly at 11. Said shafting 11 comprises a lower shaft 12 engaged at its upper end to a lower universal joint 13 which latter is connected to an intermediate shaft 15, which is engaged at its upper end by means of an upper universal joint 16 to an upper shaft 17, the axis of which is non-aligned with the axis of lower shaft 12, whereby torque transmission may be effected despite the angularity of upper shaft 17 with respect to lower shaft 12. The upper portion of shafting 11, such being shaft 17, extends through a sleeve 18 secured fixedly to top plate 4 and projecting therethrough; said sleeve 18 incorporating a bearing (not shown) for journalling of said shaft 17 which projects at its upper end upwardly of said sleeve 18 for carrying thereon a drive roller 19 for rotation therewith. With reference to FIGURES 2 and 3 it will thus be seen that the axis of rotation of drive roller 19 is at an angle of less than 90 degrees to top plate 4.

In opposed relationship to, and transversely aligned with, drive roller 19 is an idler roller 20 being mounted for rotation about a fixed shaft 21 rigid at its lower end on top plate 4, the axis of which is at a like angle to top plate 4 as sleeve 18 but extending in opposite direction therefrom.

Longitudinally aligned with, and spaced from, drive roller 19 and idler roller 20 are compression rollers 22, 23, respectively, which are mounted for rotation about short shafts 24, 25, respectively, which at their lower ends are secured to the end portions of a cross bar 26 extending transversely of plate 4 and being longitudinally arcuated (FIGURE 2), said compression rollers 22, 23 are adapted for rotation about an axis parallel to the axis of drive roller 19 and idler roller 20, respectively.

Cross bar 26 is fixed centrally of its under face, as by welding, to the upper end of a mounting arm 27 which extends freely downwardly through a slot-like opening 28 formed in top plate 4 for projection therebelow. At its lower end mounting arm 27 is pivotally engaged, as by a pin 29, to a bracket 30 fixed to column 3. By reason of its pivotal engagement to bracket 30 arm 27 is adapted for swingable movement in a vertical plane substantially axially of top plate 4 so as to effect movement of said compression rollers 22, 23 toward and away from drive roller 19 and idler roller 20, respectively, for purposes presently appearing.

Upwardly of its pivotal connection to bracket 30 and beneath top plate 4, mounting arm 27 is suitably engaged, as by means of a bracket 31, to the rearward end of a link 32 which extends laterally of column 3 to a point forwardly thereof for connection to one arm 33 of a bell crank 34 which is pivotally mounted upon a bracket 35 fixed on column 3. The other arm 36 of bell crank 34, being relatively longer than arm 33, is rockably engaged to the upper end of a vertically presented piston rod 37 of a pneumatic cylinder 38 mounted upon a support 39 carried on base plate 2. Said cylinder 38 is connected at its upper and lower ends by air ducts 40, 41 to a convenient source of compressed air whereby upon operation of the controls of cylinder 38, piston rod 37 may be caused to move reciprocally vertically therein whereby in upward position, as shown in FIGURE 1, arm 36 of bell crank 34 will be substantially horizontal, with arm 33 substantially vertical, so that mounting arm 27 will be at the rearward end of its extent of travel. Upon operation of cylinder 38 so as to depress piston rod 37, bell crank 34 will be pivoted (see FIGURE 4) to effect a pulling upon link 32 so as to draw mounting arm 27 to its forward limit of travel for presenting compression rollers 22, 23 in immediate adjacency to drive roller 19 and idler roller 20 for purposes presently appearing. It should be understood that means other than a fluid cylinder may be utilized for effecting axial movement of link 32 such as, for instance, mechanical means incorporating a sheave and cable, without in any way departing from the spirit of this invention.

Provided on top plate 4 is a pair of transversely spaced, longitudinally extending, axially parallel, bed rolls 42, 43, each of which carries at its forward and rearward end circular stop plates 44, 44', respectively, which are of increased diameter relative to bed rolls 42, 43 and with the forward stop plates 44 being located beneath drive roller 19 and idler roller 20; the rearward end stop plates 44' being disposed in immediate adjacency to the rearward end of top plate 4. It will be seen that bed rolls 42, 43 extend beneath the end portions of cross bar 26 carrying thereon compression rollers 22, 23. Said bed rolls 42, 43 are supported upon shafts 45, 46, respectively, which are suitably journalled at their ends in brackets 47 mounted on top plate 4.

Presented on substantially the longitudinal axis of top plate 4, between sleeve 18 and shaft 21 is a vertical shaft 48 having mounted for free rotation thereon at its upper end a guide roller 49 which latter is disposed within the same vertical plane as drive roller 19 and idler roller 20 but is adapted for rotation about an axis normal to top plate 4. Said guide roller 49 is provided in its peripheral surface with projecting upper and lower shoulders 50, 50' so as to define therebetween a peripheral guideway for receiving strip material as indicated generally at s for application upon tire T.

Strip material s may be fed to guide roller 49 from a supply roll, as indicated at 51, disposed for free rotation about a shaft or drum member 52 projecting upwardly from the end of an elongated support arm 53 overlying top plate 4 and having an opening at its rearward end for extension therethrough of a post 54 suitably secured, as by welding, at its lower end to top plate 4; said post 54 being proximate guide roller 49. Post 54 may be externally threaded for cooperation with a pair of lock nuts 55, 56 for engaging the upper and lower surfaces of support arm 53 for maintaining the same in selected vertical positionment upon post 54. By the aforesaid means the disposition of supply roll 51 may be suitably adjusted for proper feeding operation. Laterally of post 54, or its upper surface, support arm 53 mounts a pair of short plate sections 57, 58 for defining a narrow guide passage therebetween of such transverse extent for accommodating strip material s, upon its edge, with the ends of said plate sections 57, 58 being proximate guide roller 49 so that strip material moving therethrough will be directed to the periphery of the latter. It may be noted that the axis of the guide way formed by said plate sections 57, 58 is substantially tangential to guide roller 49 so as to conduce to the smooth and easy feeding of strip material s onto the perhiphery of guide roller 49.

In operation, with compression rollers 22, 23 spaced from drive roller 19 and idler roller 20, a tire T to be treated by device A is disposed thereupon by presenting the sidewall thereof to be faced toward the forward end of device A and with the rearward portion of top plate 4 being moved relatively through opening o of tire T so that the upper portion of the sidewall to be treated is received between drive roller 19 and idler roller 20 and compression rollers 22, 23, the lower edge of the so-received sidewall portion abutting the forward portions of bed rolls 42, 43 and in contact with the rearward faces of forward end stop plates 44. The upper portion of the opposite sidewall of tire T is received upon the rearward portions of bed rolls 42, 43 and in abutment with the forward faces of rearward end stop plates 44' (FIGURE 4) so that bed rolls 42, 43 are, thus, obscured from view by being received within the tire casing. The user will then so operate pneumatic cylinder 38 so as to cause piston rod 37 to descend with consequent forward movement of compression rollers 22, 23 effecting a tight gripping therebetween of the interposed portion of the sidewall of tire T between same and drive roller 19 and idler roller 20. Upon energization of prime mover M with attendant rotation of driven shafting 11, drive roller 19, which is now in frictional engagement with the adjacent portion of the sidewall of tire T, will be rotated and thereby cause tire T to be rotated in the direction indicated by arrows in FIGURE 2. By reason of the snug engagement of tire T between drive roller 19 and idler roller 20 on the one hand and compression rollers 22, 23 on the other, as well as by reason of the support accorded by bed rolls 42, 43, tire T will be rotated within a vertical plane being inhibited against undesired rocking or swinging movement.

Strip material s to be applied upon the confronting side wall of tire T is provided on its normally inward surface with a suitable adhesive or the side wall may have been previously prepared for adherence to such material s which is fabricated primarily of natural or synthetic rubber and being white on its exterior face.

The free edge of supply roll 51 is led between plates 58, 57 and between the shoulders 50, 50' of guide rollers 49, and then between said guide roller 49 and tire side wall; prime mover M is then energized to cause tire T to move in a path which would be clockwise as viewed in FIGURE 2. Such movement will pull strip material s along with tire T and remove same from supply roll 51. The rotation of tire T is continued until the side wall of said tire T has had applied thereon a complete annulus of said strip material s. Motor M is then stopped and the operator by any suitable tool such as a knife cuts the strip material at guide roller 49 and thereupon removes the tire T with the now applied white side wall.

It will thus be seen that the present invention provides a novel yet highly accurate and positive manner within which to rapidly and efficiently apply a white side wall to a vehicle tire. The guide roller 49 is so dimensioned that the space between shoulders 50, 50' will snugly accommodate the particular height of strip material s and with said guide roller so positioned with respect to the tire T to be treated that a direct transfer is made of the strip material s from guide roller 49, onto the tire T.

It will be further noted that by reason of the adjacency of drive roller 19 to guide roller 49, the most recently applied increment of strip material s will be immediately subjected to pressureful contact with said drive roller 19 for assuring of snug bonding.

The present invention can be utilized with any tire size. Normally, the portions of tire to be treated with a white side wall are the same distance from the inner edge of the tire so that with one setting device A could accommodate all tires. No adjustment is needed regardless of tire size, since the radius location of the portion to be treated with a white side wall is constant regardless of the tire dimensions. It will be seen that elements of this invention are so uniquely interrelated as to permit of universal accommodation without requiring tedious and laborious efforts on the part of an operator to bring about adjustments.

Although the foregoing sets forth and describes device A for the primary purpose of applying white side wall material to tires, it should be recognized that said device is suitable for a multiplicity of uses for treating tires. By removal of arm 53 together with the strip material s thereon as well as guide roller 49, there does remain a mechanical system for supporting and rotating a tire to allow facile and convenient treatment of its side or edge surfaces. The same would then be adapted to allow for tire cleaning by any suitable means such as motor driven brushes, and the like or for grinding action for roughening the side face for better bonding action by adhesive materials; or for visual inspection and study.

The present invention may also be most economically manufactured and utilized by personnel with but limited instruction.

It should be understood that changes and modifications in the formation, construction, arrangement, and combination of the several parts of the sash balance may be made and substituted for these herein shown and described without departing from the nature and principle of my invention.

Having thus described my invention, what I claim and desire to secure by Letters patent is:

1. A tire treatment device comprising a frame, means provided on said frame for supporting a vehicle tire in upright position, a drive roller mounted on said frame for presentation in confronting relationship to an outer side wall portion of the tire to be treated, means for effecting rotation of said driver roller, and means for compressing said tire against said drive roller whereby upon operation of the latter the tire will be rotated within a vertical plane.

2. A tire treatment device comprising a frame having a plate located upwardly from a support surface and being dimensioned for projection through the opening of a vertical tire, tire support members mounted on said plate for engaging the upper edge portion of the tire opening for presenting the tire in vertical position, a drive roller mounted on said frame for presentation in confronting relationship to an outer side wall portion of the tire to be treated, means for effecting rotation of said drive roller, and means for compressing said tire against said drive roller whereby upon operation of the latter the tire will be rotated within a vertical plane.

3. A tire treatment device as defined in claim 2 and further characterized by said tire support members comprising horizontally presented bed rolls.

4. A tire treatment device comprising a frame having a plate located upwardly from a support surface and dimensioned for extension through the central opening of a vehicle tire, support members provided on said plate for engaging the upper edge portion of the tire opening for suspending the later in a vertical position, a drive roller carried on said frame and carried for disposition confrontingly with respect to one outer side face portion of said tire, means for effecting rotation of said drive roller, compression members carried on said frame for disposition above said tire support members and means for moving said compression members for presenting the tire to be treated in contactive engagement with said drive roller whereby upon operation of the latter, said tire is rotated in a vertical line.

5. A tire treatment device as defined in claim 4 and further characterized by said tire support members comprising horizontally presented bed rolls.

6. A tire treatment device as defined in claim 4 and further characterized by said means for effecting movement of said compression members being pneumatically operated.

7. A tire treatment device comprising a frame having a base plate, an upright mounted on said base plate, a top plate carried on said upright, said top plate being dimensioned for extension through the opening of the vehicle tire to be treated, a pair of bed rolls mounted in horizontal disposition upon, and extending longitudinally of said top plate for supporting the tire to be treated by engaging the upper edge portion of the tire opening, a pair of transversely spaced apart compression rollers provided above said bed rolls, means for moving said compression rollers, longitudinally of said top plate, a drive roller carried on said frame for presentation adjacent the end of one bed roll for confronting relationship with respect to the adjacent side wall portion of the tire to be treated and means for effecting rotation of said drive roller.

8. A tire treatment device comprising a frame having a base plate, an upright carried on said base plate and a top plate fixed on said upright, said top plate being dimensioned for extension through the opening of a tire to be treated, a pair of bed rolls disposed horizontally upon and extending longitudinally of said base plate, said bed rolls having such length as to accommodate a tire of varying thickness for supporting same in vertical disposition upon said device by engaging the upper edge portion of the opening thereof, a drive roller carried on said frame for presentation proximate one end of one of said bed rolls, means for effecting rotation of said drive roller, an idler roller carried on said frame for presentation proximate the corresponding end of the other bed roll and not transversely aligned relationship with respect to said drive roller, first and second compression rollers disposed above each of said bed rolls and in longitudinal alignment with said drive roller and said idler roller, respectively, and means for moving said first and second compression rollers, respectively, toward said drive roller and said idler roller for gripping the intervening side wall portion of the tire to be treated whereby upon operation of said drive roller said tire will be caused to rotate within its vertical plane.

9. A tire treatment device as defined in claim 8 wherein the axis of rotation of said drive roller is at an angle of less than 90° to the horizontal.

10. A tire treatment device as defined in claim 8 and further characterized by pneumatic means for effecting movement of said compression rollers.

11. A tire treatment device as defined in claim 8 wherein the axis of rotation of said drive roller and said idler roller are of less than 90° to the horizontal, but extending in opposite directions.

12. A tire treatment device as defined in claim 11, and further characterized by a guide roller presented intermediate said drive roller and said idler roller and adapted for rotation about a vertical axis and means for feeding strip material to said guide roller for application upon the tire to be treated.

13. A tire treatment device as defined in claim 11, and further characterized by a guide roller disposed intermediate said drive roller and said idler roller and being adapted for rotation about said vertical axis, means provided upwardly of said top plate for supporting a supply of material to be applied to said tire to be treated, and means for guiding material from said supply to said guide roller.

14. A tire treatment device comprising a frame, means provided on said frame for supporting a vehicle tire in upright position, a drive roller mounted on said frame for presentation in confronting relationship to an outer side wall portion of the tire to be treated, means for effecting rotation of said drive roller, a compression member carried on said frame, and means for moving said compression member for presenting the tire to be treated in contactive engagement with said drive roller whereby upon operation of the latter the tire will be rotated within a vertical plane.

References Cited

UNITED STATES PATENTS

| | | | |
|---|---|---|---|
| 2,734,553 | 2/1956 | Rawls | 156—96 |
| 2,992,675 | 7/1961 | Bakke | 144—288 X |
| 3,097,984 | 7/1963 | Godfrey | 156—96 X |
| 3,117,047 | 1/1964 | Capistrant et al. | 156—128 X |
| 3,144,734 | 8/1964 | Olson | 144—288 X |
| 3,177,918 | 4/1965 | Holman | 156—96 X |
| 3,223,572 | 12/1965 | Holloway et al. | 156—130 X |

HAROLD ANSHER, *Primary Examiner.*

U.S. Cl. X.R.

144—288; 156—116